(12) United States Patent
Choi et al.

(10) Patent No.: US 10,844,519 B2
(45) Date of Patent: Nov. 24, 2020

(54) PRODUCING FIBERS USING SPINNERETS

(71) Applicant: Saudi Arabian Oil Company, Dhahran (SA)

(72) Inventors: Seung-Hak Choi, Dhahran (SA); Sarah N. Almahfoodh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 138 days.

(21) Appl. No.: 15/961,467

(22) Filed: Apr. 24, 2018

(65) Prior Publication Data

US 2019/0233971 A1 Aug. 1, 2019

Related U.S. Application Data

(60) Provisional application No. 62/624,311, filed on Jan. 31, 2018.

(51) Int. Cl.
| | |
|---|---|
| *D01D 5/24* | (2006.01) |
| *B01D 69/08* | (2006.01) |
| *B29C 48/05* | (2019.01) |
| *B29C 48/00* | (2019.01) |
| *D01D 5/253* | (2006.01) |
| *D01D 4/02* | (2006.01) |
| *D01D 5/22* | (2006.01) |
| *B29L 31/00* | (2006.01) |

(52) U.S. Cl.
CPC .............. *D01D 5/24* (2013.01); *B01D 69/082* (2013.01); *B01D 69/085* (2013.01); *B01D 69/087* (2013.01); *B29C 48/0015* (2019.02); *B29C 48/05* (2019.02); *D01D 4/02* (2013.01); *D01D 4/027* (2013.01); *D01D 5/22* (2013.01); *D01D 5/253* (2013.01); *B01D 2325/08* (2013.01); *B29L 2031/731* (2013.01); *B29L 2031/755* (2013.01)

(58) Field of Classification Search
CPC . D01D 5/18; D01D 4/06; D01D 4/027; B29C 48/0015; B01D 69/082; B01D 69/085; B01D 69/087
See application file for complete search history.

(56) References Cited

U.S. PATENT DOCUMENTS

| | | | |
|---|---|---|---|
| 3,075,242 | A | 1/1963 | Emil |
| 4,222,977 | A | 9/1980 | Dobo |
| 4,229,154 | A | 10/1980 | Chaban, Jr. et al. |

(Continued)

FOREIGN PATENT DOCUMENTS

| | | |
|---|---|---|
| EP | 586559 | 3/1994 |
| EP | 767259 | 4/1997 |

(Continued)

OTHER PUBLICATIONS

Yang—Optimization of microstructured hollow fiber design for membrane distillation applications using CFD modeling; Journal of Membrane Science. 2012 (Year: 2012).*

(Continued)

*Primary Examiner* — Jacob T Minskey
*Assistant Examiner* — Virak Nguon
(74) *Attorney, Agent, or Firm* — Fish & Richardson P.C.

(57) ABSTRACT

Systems and methods can be used to produce fibers with external corrugations, internal corrugations, or both. These fibers can be used, for example, in hollow fiber membrane modules.

10 Claims, 15 Drawing Sheets

(56) References Cited

U.S. PATENT DOCUMENTS

| | | |
|---|---|---|
| 4,317,729 A | 3/1982 | Yamashita et al. |
| 4,362,677 A | 12/1982 | Yamashita et al. |
| 4,430,219 A | 2/1984 | Kuzumoto et al. |
| 4,546,043 A | 10/1985 | Yoshimoto et al. |
| 4,631,162 A | 12/1986 | Yoshimoto et al. |
| 4,743,189 A | 5/1988 | Samuelson |
| 4,820,460 A | 4/1989 | Repetti et al. |
| 4,830,640 A | 5/1989 | Nakamura et al. |
| 4,850,847 A | 7/1989 | Samuelson |
| 4,861,661 A | 8/1989 | Samuelson |
| 4,915,886 A | 4/1990 | Repetti et al. |
| 4,938,902 A | 7/1990 | Nakamura et al. |
| 4,941,812 A | 7/1990 | Samelson |
| 4,950,391 A | 8/1990 | Weickhardt |
| 5,069,793 A | 12/1991 | Kaschemakat et al. |
| 5,102,484 A | 4/1992 | Allen et al. |
| 5,242,636 A | 9/1993 | Sluma et al. |
| 5,330,348 A | 7/1994 | Aneja et al. |
| 5,356,461 A | 10/1994 | Sluma et al. |
| 5,439,626 A | 8/1995 | Bennett et al. |
| 5,556,589 A | 9/1996 | Sibal |
| 5,598,874 A | 2/1997 | Alei et al. |
| 5,604,036 A | 2/1997 | Price et al. |
| 5,643,660 A | 7/1997 | Price et al. |
| 5,707,584 A | 1/1998 | Terpstra et al. |
| 5,833,896 A | 11/1998 | Jacobs et al. |
| 5,837,033 A | 11/1998 | Giglia et al. |
| 6,521,025 B1 | 2/2003 | Shilton et al. |
| 6,551,088 B2 | 4/2003 | Nguyen et al. |
| 6,623,637 B1 | 9/2003 | Monzen et al. |
| 6,630,069 B2 | 10/2003 | Sakashita et al. |
| 6,660,377 B2 | 12/2003 | Bernaschek |
| 6,797,209 B2 | 9/2004 | Travelute et al. |
| 6,805,730 B2 | 10/2004 | Herczeg |
| 7,001,664 B2 | 2/2006 | Travelute et al. |
| 7,393,195 B2 | 7/2008 | Keller et al. |
| 8,104,624 B2 | 1/2012 | Chidambaran et al. |
| 8,424,688 B2 | 4/2013 | Chidambaran et al. |
| 8,491,716 B2 | 7/2013 | Cho et al. |
| 8,871,140 B2 | 10/2014 | Cho et al. |
| 9,109,305 B2 | 8/2015 | Choi et al. |
| 9,156,003 B2 | 10/2015 | Kelada |
| 9,211,503 B2 | 12/2015 | Xiao et al. |
| 9,234,302 B2 | 1/2016 | Weber et al. |
| 9,353,220 B2 | 5/2016 | Savariar et al. |
| 9,427,699 B2 | 8/2016 | Mayer et al. |
| 2002/0173209 A1 | 11/2002 | Travelute et al. |
| 2003/0118763 A1 | 6/2003 | Travelute et al. |
| 2004/0086594 A1 | 5/2004 | Bernaschek |
| 2005/0037196 A1 | 2/2005 | Travelute et al. |
| 2008/0023863 A1 | 1/2008 | Lee et al. |
| 2009/0115078 A1 | 5/2009 | Leister |
| 2011/0198287 A1 | 8/2011 | Dukes et al. |
| 2011/0308707 A1 | 12/2011 | Montoya |
| 2012/0125850 A1* | 5/2012 | Fujimura ............ B01D 69/082 |
| | | 210/650 |
| 2012/0151890 A1 | 6/2012 | Pearson |
| 2012/0304862 A1 | 12/2012 | Taylor |
| 2013/0105391 A1 | 5/2013 | Friese |
| 2014/0076793 A1 | 3/2014 | Rya |
| 2015/0241139 A1 | 8/2015 | McGinnis |
| 2015/0265972 A1 | 9/2015 | Roesink |
| 2016/0288058 A1* | 10/2016 | Tai .................... B29C 48/11 |
| 2019/0187015 A1 | 6/2019 | Sugita |

FOREIGN PATENT DOCUMENTS

| | | |
|---|---|---|
| JP | 6418407 | 1/1989 |
| JP | 6422308 | 1/1989 |
| JP | 227030 | 8/1992 |
| JP | 2001190936 | 7/2001 |
| JP | 2001040566 | 2/2011 |
| KR | 20140059560 | 5/2014 |
| KR | 20140059560 A * | 5/2014 |
| KR | 20160001142 | 1/2016 |
| KR | 101648843 | 8/2016 |
| WO | 2014177697 | 11/2014 |

OTHER PUBLICATIONS

International Search Report and Written Opinion issued in International Application No. PCT/US2019/015550 dated Apr. 5, 2019, 12 pages.

International Search Report and Written Opinion issued in International Application No. PCT/US2019/015544 dated Apr. 5, 2019, 16 pages.

Mat et al., "Hollow fiber membrane modules," Current Opinion in Chemical Engineering vol. 4, May 2014, 7 pages.

Nijdam et al., "High performance micro-engineered hollow fiber membranes by smart sinneret design," Journal of Membrane Science, vol. 256, Issue 1-2, Jul. 1, 2005, 7 pages.

Yang et al., "Novel designs for improving the performance of hollow fiber membrane distillation modules," Journal of Membrane Science vol. 384, Nov. 15, 2011, 11 pages.

Yang et al., "Optimization of microstructural hollow fiber design for membrane distillation applications using CFD modeling," Journal of Membrane Science vol. 421-422, Dec. 1, 2012, 54 pages.

International Search Report and Written Opinion issued in International Application No. PCT/US2018/041631 dated Oct. 23, 2018, 48 pages.

Collins English Dictionary, Complete and Unabridged, "Spacer," Harper Collins Publishers 12th Edition, 2014, 1 page.

GCC Examination Report in GCC Appln No. GC 2019-36955, dated Jul. 29, 2020, 4 pages.

* cited by examiner

PRODUCING FIBERS USING SPINNERETS

CROSS-REFERENCE TO RELATED APPLICATIONS

This application claims priority to U.S. Provisional Patent Application Ser. No. 62/624,311, filed on Jan. 31, 2018, the disclosure of which is hereby fully incorporated by reference in its entirety.

BACKGROUND

Hollow fiber membranes (HFMs) are a class of artificial membranes containing a semi-permeable barrier in the form of a hollow fiber. Originally developed in the 1960s for reverse osmosis applications, hollow fiber membranes have since become prevalent in gas separation, vapor permeation, water treatment, desalination, cell culture, medicine, and tissue engineering. Most commercial hollow fiber membranes are packed into modules or cartridges that can be used for a variety of liquid and gaseous separations.

HFMs are commonly produced using artificial polymers. The specific production methods involved are heavily dependent on the type of polymer used as well as its molecular weight. HFM production, commonly referred to as "spinning," can be performed using a spinneret, a device containing a needle through which bore fluid is extruded and an annulus through which a polymer solution is extruded. As the polymer is extruded through the annulus of the spinneret, it retains a hollow cylindrical shape. As the polymer exits the spinneret, it solidifies into a membrane through a process known as phase inversion.

SUMMARY

This disclosure describes machines and methods for producing fibers using spinnerets. The fibers are produced by extruding a polymer through a spinneret that solidifies after extrusion from the spinneret. These systems and methods can produce a variety of solid fibers with external corrugations and hollow fibers with external corrugations, internal corrugations, or both external and internal corrugations. These systems and methods can be used, for example, phase inversion spinning process including dry-wet spinning, wet spinning, and melt spinning.

Fibers with patterns of corrugations produced by these systems and methods can be used as spacers in HFM modules to reduce concentration polarization by improving mixing of feed and/or permeate fluid streams in the modules, to reduce fouling with the rough surface of spacers, and to reduce dead-area or channeling in the modules. These effects can significantly improve the efficiency HFM modules incorporating these fibers.

Fibers with corrugations can be fabricated as solid fibers (also referred to as threads) or as hollow fibers. Hollow fibers with corrugations can act as spacers within a HFM module while also being involved in actual separation. In contrast, solid fibers with corrugations act as spacers for better mixing and minimizing concentration polarization in order to maximize mass transfer coefficient in outside of the hollow fiber bundle without directly being involved in the actual separation.

In one aspect, machines for producing fibers for use in a hollow fiber module include: a spinneret having a base and an needle, the base and the needle at least partially defining a channel having an axis; at least one projection extending into the channel; and a motor connected to the at least one projection, the motor operable to rotate the at least one projection relative to the axis of the channel.

In one aspect, machines for producing fibers include: a spinneret defining a first channel, the spinneret having at least one projection extending into the first channel; and a motor connected to the at least one projection, the motor operable to rotate the at least one projection relative to an axis of the channel.

Embodiments of these machines can include one or more of the following features.

In some embodiments, the at least one projection extends from the base into the channel. In some cases, the base is rotatable about the axis of the channel. In some cases, the motor is operably coupled to the base such that operation of the motor rotates the base about the axis of the channel.

In some embodiments, the projection is detachable from the spinneret. In some cases, machines include an insert detachably mounted to the base, wherein the at least one projection extends from the insert into the channel. In some cases, the insert is rotatable relative to the base.

In some embodiments, machines include a cap sized to receive the insert, the cap rotatable relative to the base. In some cases, the motor is operably coupled to the cap such that operation of the motor rotates the cap about the axis of the channel.

In some embodiments, the channel is a first channel and the needle defines a second channel inside the needle, the second channel separated from the first channel by the needle.

In some embodiments, machines include a control unit operable to send a control signal to the motor.

In some embodiments, the needle of the spinneret defines a second channel concentric with the first channel. In some cases, machines include an insert detachably mounted to the base, wherein the at least one projection extends from the insert into the channel.

In some embodiments, machines include a base with an inlet and an outlet. In some cases, the projection is disposed upstream of the outlet of the base. In some cases, the projection is disposed downstream of the outlet of the base.

In one aspect, methods for producing fibers with corrugations include: flowing a first fluid through a first channel at least partially defined in a spinneret; rotating a projection of the spinneret that extends into the channel of the spinneret as the fluid flows past the projection; and solidifying the fluid to form a fiber downstream of the projection.

Embodiments of these machines can include one or more of the following features.

In some embodiments, the methods include flowing a second fluid through a second channel concentric with the first channel.

In some embodiments, rotating the projection includes rotating the projection in a first direction. In some cases, rotating the projection includes rotating the projection in a second direction opposite the first direction.

In some embodiments, rotating the projection includes rotating a base of the spinneret from which the projection extends.

In some embodiments, rotating the projection includes rotating a plurality of projections.

In some embodiments, the methods include placing an insert from which the projection extends into a cap downstream of a base of the spinneret. In some cases, rotating the projection includes rotating the insert.

In one aspect, machines for producing spacer fibers for use in a hollow fiber module include: a spinneret defining a first channel extending between an inlet and an outlet; and a first blade extending into the channel, the first blade having a surface set at an acute angle to a wall of the channel from which the blade extends.

In one aspect, machines for producing fibers include: a spinneret defining a first channel extending from an inlet to an outlet; wherein the spinneret has at least one blade set in the channel with a surface at an acute angle to a wall of the channel from which the blade extends.

Embodiments of these machines can include one or more of the following features.

In some embodiments, the spinneret includes: a base and a needle inserted into the base. In some cases, the first blade is disposed on the base of the spinneret. In some cases, machines include a second blade having a surface set at an acute angle to a wall of the channel from which the blade extends, wherein the second blade is disposed on the needle of the spinneret.

In some embodiments, the first blade is disposed on the needle of the spinneret.

In some embodiments, the first blade is one of a plurality of the first blades. In some cases, the first blades are disposed at evenly spaced locations around the circumference of the first channel. In some cases, the first blades are disposed on the base of the spinneret. In some cases, machines include a plurality of second blades disposed on the needle of the spinneret.

In some embodiments, the acute angle is between 30 and 85 degrees.

In some embodiments, the first blade has a thickness between 10 to 50% of the thickness of the channel.

In some embodiments, the at least one blade includes a plurality of first blades disposed on the base of the spinneret. In some cases, the at least one blade includes a plurality of second blades disposed on the needle of the spinneret. In some cases, the first blades are disposed at evenly spaced locations around the circumference of the channel.

In some embodiments, the at least one blade includes a plurality of blades disposed on the needle of the spinneret.

In one aspect, methods for producing fibers include: flowing a fluid through a channel defined in a spinneret; disrupting the flow of the fluid using at least one blade set in the channel with a surface at an acute angle to a wall of the channel from which the blade extends; and solidifying the fluid to form a fiber downstream of an outlet of the channel.

Embodiments of these methods can include one or more of the following features.

In some embodiments, flowing the fluid through the channel defined in the spinneret includes flowing the fluid through an annular channel defined in the spinneret. In some cases, the at least one blade includes is at least one blade extending into the channel from an outer wall defining the annular channel. In some cases, the at least one blade includes is at least one blade extending into the channel from an inner wall defining the annular channel. In some cases, the at least one blade includes is at least one blade extending into the channel from an inner wall defining the annular channel.

In some embodiments, disrupting the flow of the fluid using at least one blade set in the channel with a surface at an acute angle to a wall of the channel from which the blade extends induces rotation in the fluid about an axis of the channel.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

FIG. 10C shows the circular inner surface as a planar side view.

DETAILED DESCRIPTION

This disclosure describes machines and methods for producing fibers using spinnerets. The fibers are produced by extruding a polymer through a spinneret that solidifies after extrusion from the spinneret. These systems and methods can produce a variety of solid fibers with external corrugations and hollow fibers with external corrugations, internal corrugations, or both external and internal corrugations.

Some of these systems and methods produce the corrugations by rotating projections extending into a channel containing the polymer. Some of these systems and methods produce the corrugations using angled blades extending into a channel containing the polymer.

Figure 1:
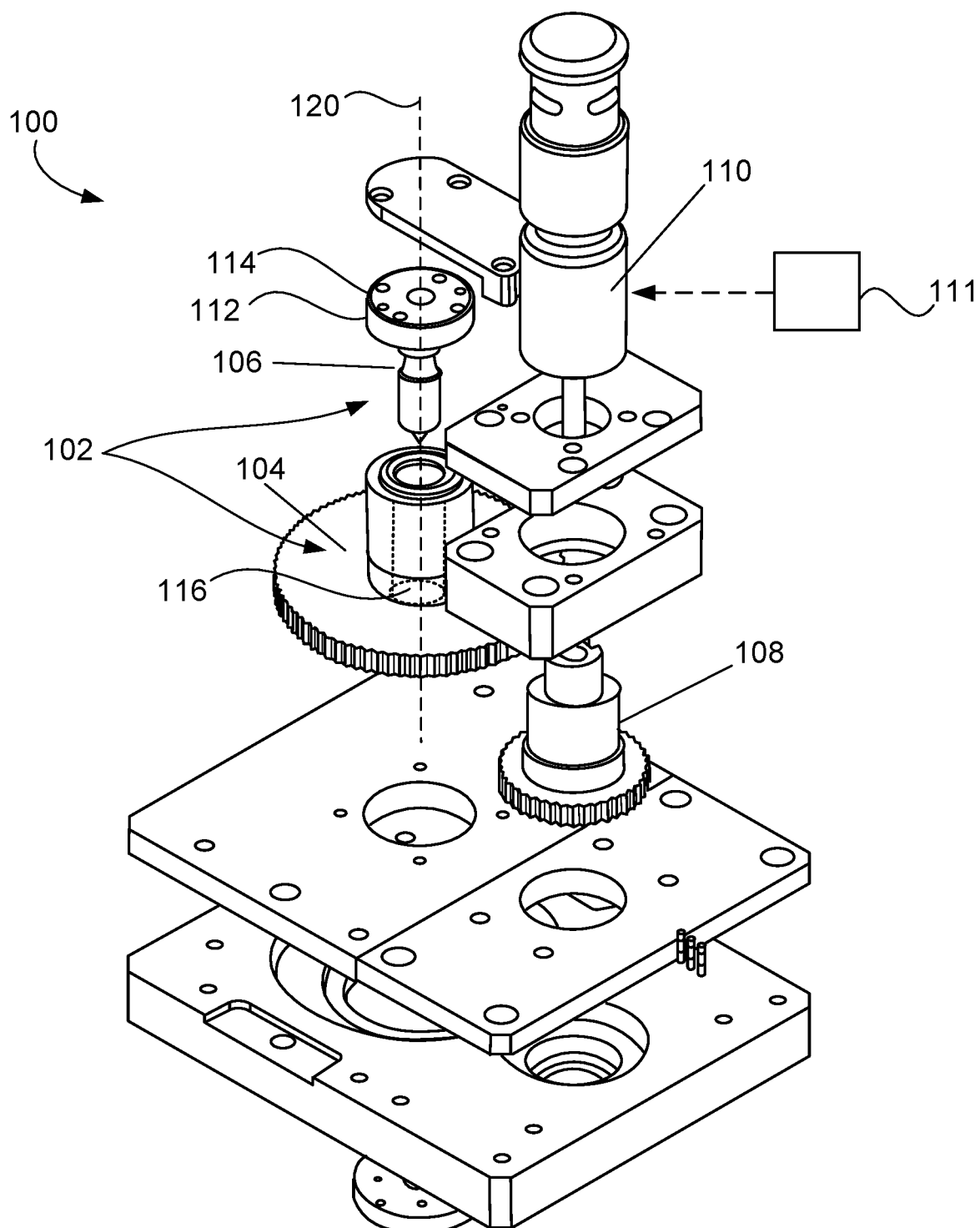
FIG. 1 shows a machine for use in producing fibers using a spinneret.

FIG. 1 illustrates a machine 100 for use in producing fibers using a spinneret 102. The spinneret 102 includes a base 104 and a needle 106. A connecting gear 108 is coupled to a motor 110 and the base 104 so that operation of the motor 110 rotates the base 104 via the connecting gear 108. The base 104 and the needle 106 are releasably coupled, but are able to rotate relative to one another. For example, the base 104 and the needle 106 may be threadedly coupled, to prevent liquid from escaping at the coupling.

A control unit 111 is operable to control the machine 100. The control unit 111 sends signals to the motor 110. The signals sent by the control unit 111 can result in the motor 110 turning on, rotating a first direction, rotating a second direction, stopping rotation, or turning off. The spinneret 102 has outer inlets 112, a central inlet 114, and an outlet 116. The outer inlets 112 and the central inlet 114 are in fluid communication with the outlet 116 but are not in fluid communication with each other except at the outlet 116.

Figure 2:
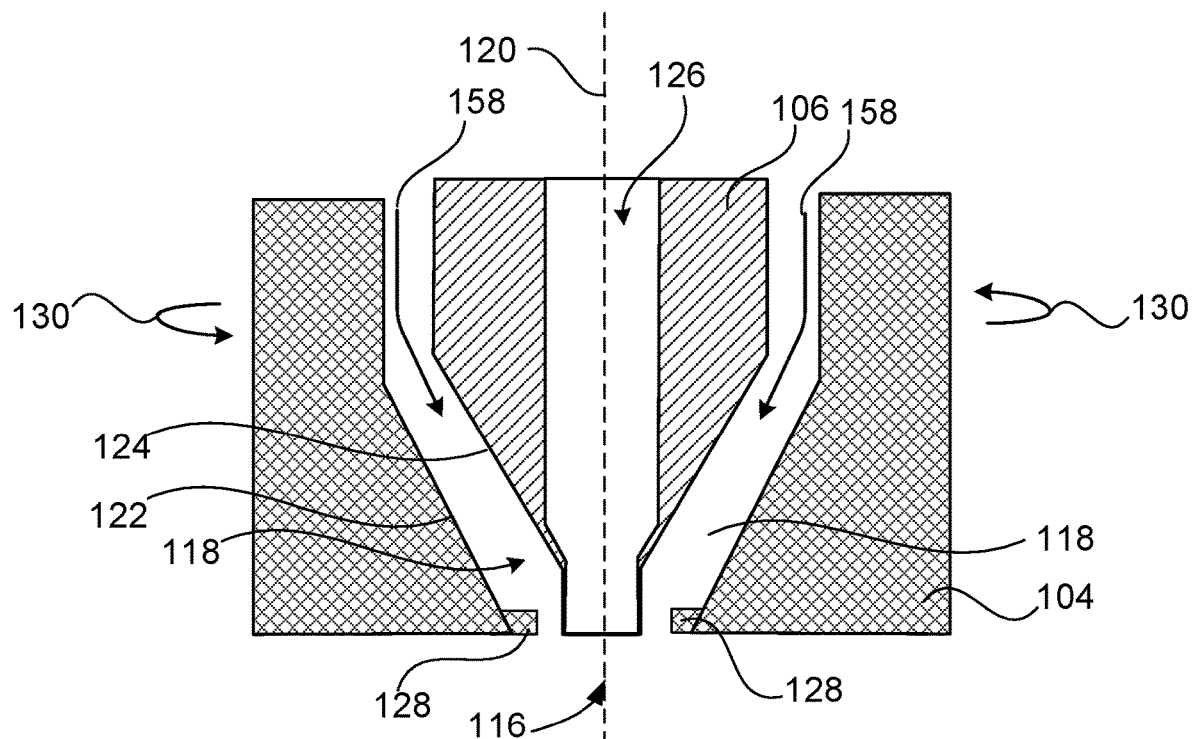
FIG. 2 is a cross-section of an outlet portion of the spinneret of the machine shown in FIG. 1.
Figure 3:
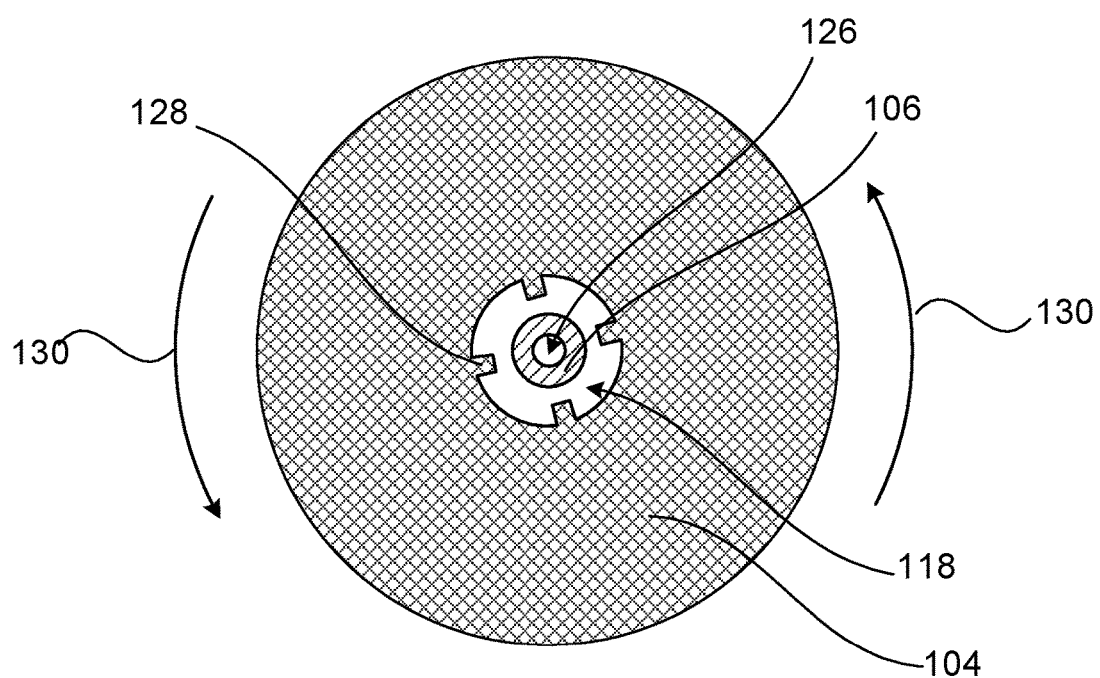
FIG. 3 is planar view of the outlet portion of the spinneret of the machine shown in FIG. 1.

FIG. 2 and FIG. 3 show an outlet portion of the spinneret 102 of the machine 100. The base 104 and needle 106 at least partially define a first channel 118. The first channel 118 is an annular channel with an axis 120. The base 104 provides an outer wall 122 of the first channel 118 and the needle 106 provides an inner wall 124 of the first channel 118. The first channel 118 is in fluid communication with the outer inlets 112 and the outlet 116. The needle 106 defines a second channel 126 inside the needle 106. The second channel 126 is in fluid communication with the central inlet 114 and the outlet 116 of the spinneret 102. The needle 106 separates the second channel 126 from the first channel 118.

The spinneret 102 has projections 128 extending into the first channel 118. In the machine 100, four projections 128 extend into the first channel 118. Some machines have more projections (for example, six projections or eight projections). Some machines have fewer projections (for example, three projections, two projections, or one projection). In the machine 100, the projections 128 extends inward from the base 104 into the first channel 118. As will be discussed later in this disclosure, some machines have projections that extend from the needle 106 instead of or in addition to the projections extending from the base 104. The projections 128 are located at an outlet 116.

As discussed with reference to FIG. 1, operation of the motor 110, rotates the connecting gear 108, the base 104, and the projections 128 extending from the base 104 into the first channel 118. The arrows 130 in FIG. 2 and FIG. 3 indicate rotation of the base 104. The arrows 130 indicate a single direction of rotation for the base. As previously described, the motor 110 can be operated in reverse to rotate the base 104 in the opposite direction. The projections 128 protrude into the first channel 118 to at least partially disrupt the flow of the first fluid while the base 104 and projections 128 rotate.

The control unit 111 (see FIG. 1) is operable to control the rotational speed and rotational direction of the motor 110. The control unit 111 is capable of sending a wide variety of signals to a receiver on the motor 110. For example, the signals sent by the control unit 111 may be constant (producing a constant rotation), sinusoidal (producing an alternating rotation), or step wise (producing a start-stop rotation). As previously discussed, the motor 110 operably connected to the spinneret 102 by the gear 108. In the machine 100, rotation of the motor 110 rotates the connecting gear 108, which in turn rotates the base 104 and the projections 128.

Figure 4:
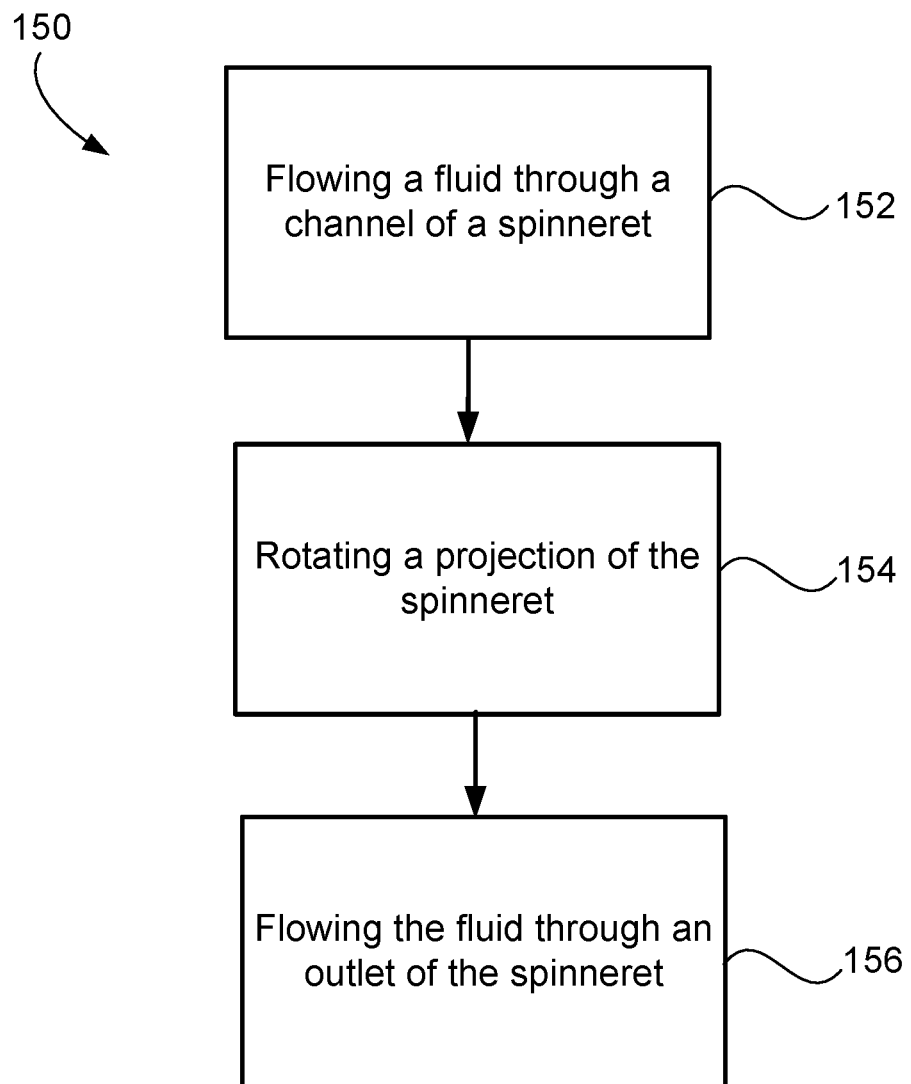
FIG. 4 shows a method for producing a fiber.

FIG. 4 illustrates a method 150 for producing fibers using, for example, the machine 100. The method 150 is described with reference to the machine 100 and its components shown in FIG. 1-3. The method 150 includes flowing a fluid through a channel of the spinneret 102 (step 152), rotating a projection 128 of the spinneret 102 (step 154), and solidifying the fluid to form a fiber downstream of the projection 128 (step 156).

In operation, the machine 100 flows a first fluid (for example, a polymer solution) through the first channel 118 and a second fluid (for example, a bore fluid) through the second channel 126. As the two fluids pass through the outlet 116, the polymer retains a hollow cylindrical shape due to the presence of the solvent as the polymer exits the spinneret 102.

As the polymer flows through the first channel 118 in the direction of arrows 158, operation of the motor 110 rotates the base 104 and the projections 128 extending into the first channel 118 from the base 104. The projections 128 and base form a corrugation on an outer surface of the first fluid. As the first fluid exits the outlet 116, the first fluid solidifies into a fiber with a corrugation on its outer surface.

The machine 100 can also be used to form solid fibers by extruding the polymer through the first channel 118 without flowing the bore fluid through the second channel 126. Without the bore fluid, the polymer fills the center of the fluid stream to solidify as a solid fiber. The surface of the solidified fiber retains the corrugation from the surface of the first fluid, producing a solid fiber with a corrugation on the outer surface.

The control unit 111 is operable to control the motor 110 by sending signals to the motor 110. The control unit 111 may transmit a variety of signals. The signals may affecting the motor 110 so that it turns on, begins rotating in a first direction, stops rotating, begins rotating in a second direction, or turns off. Additionally, the signals can affect the speed at which the motor 110 rotates.

Figure 5D:
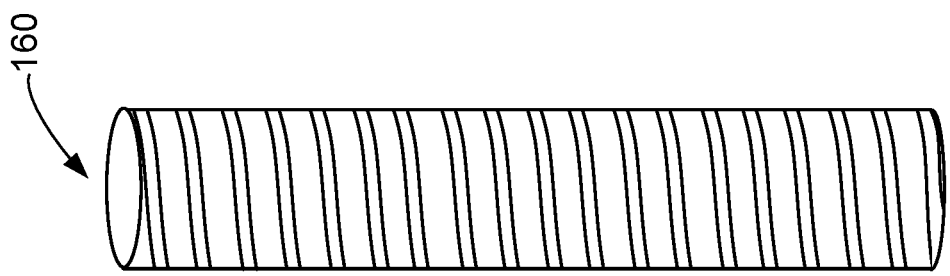
FIG. 5D shows an exemplary hollow fiber produced by a spinneret system with a motor that receives a sinusoidal signal.
Figure 5C:
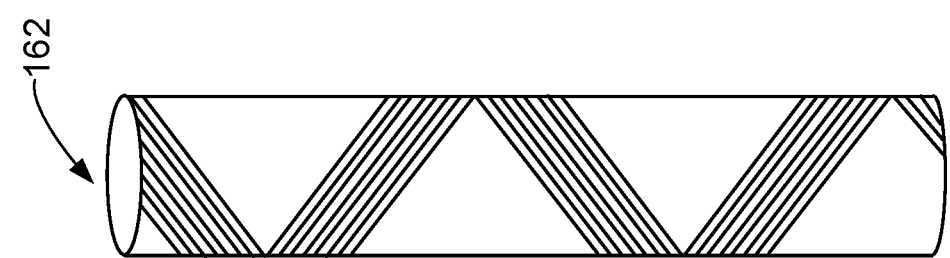
FIG. 5C shows an exemplary hollow fiber produced by a spinneret system with a motor that receives a constant signal.
Figure 5B:
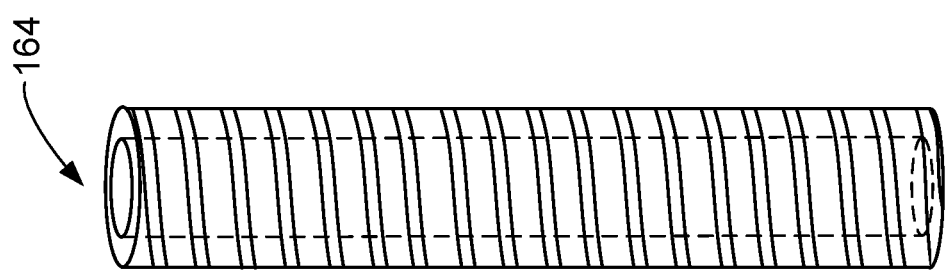
FIG. 5B shows an exemplary solid fiber produced by a spinneret system with a motor that receives a sinusoidal signal.
Figure 5A:
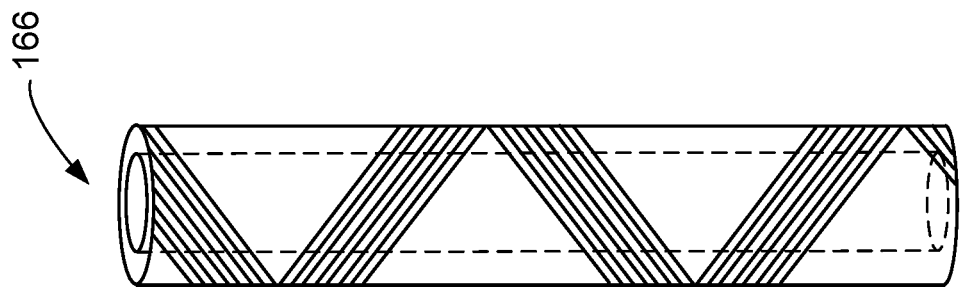
FIG. 5A shows an exemplary solid fiber produced by a spinneret system with a motor that receives a constant signal.

FIGS. 5A-5D show exemplary fibers formed using the machine 100. FIG. 5A shows a fiber 160 formed when the control unit 111 sends a constant signal causing the motor 110 to rotate the base 104 and the projections 128 in one direction at a constant speed. This mode of operation provides the fiber 160 with a helix or coil corrugation with a constant pitch and height. FIG. 5B shows a fiber 162 formed when the control unit 111 sends a sinusoidal signal which causes the motor 110 to alternatively operate in forward and in reverse to rotate the base 104 and the projections 128 in a first direction and then in an opposite second direction. This mode of operation provides the fiber 162 with a zig-zag corrugation on its outer surface. FIGS. 5C and 5D, respectively, show a hollow fiber 164 with a helical corrugation and a hollow fiber 166 with a zig-zag corrugation.

Figure 6:
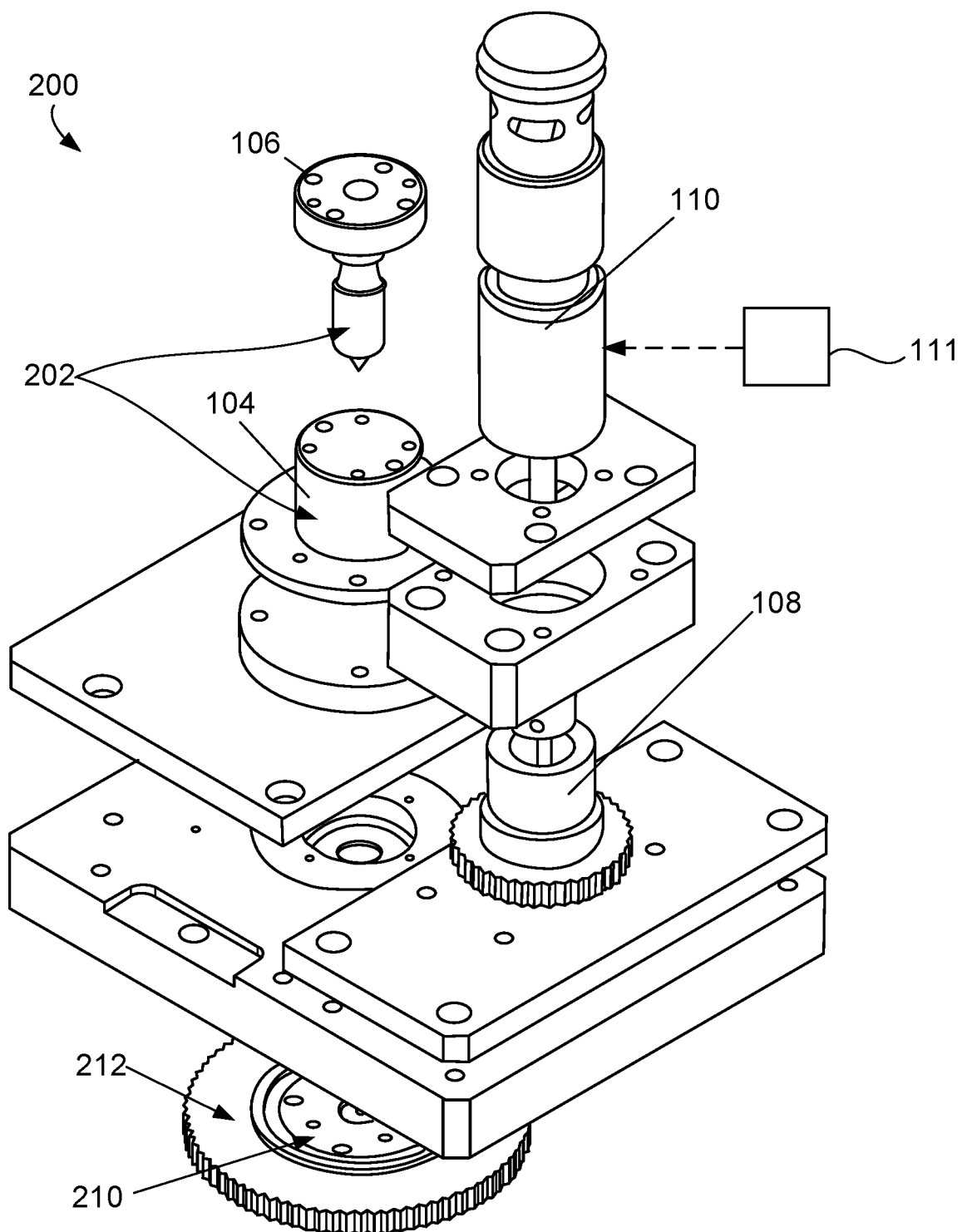
FIG. 6 shows a machine for use in producing fibers using a spinneret.
Figure 7:
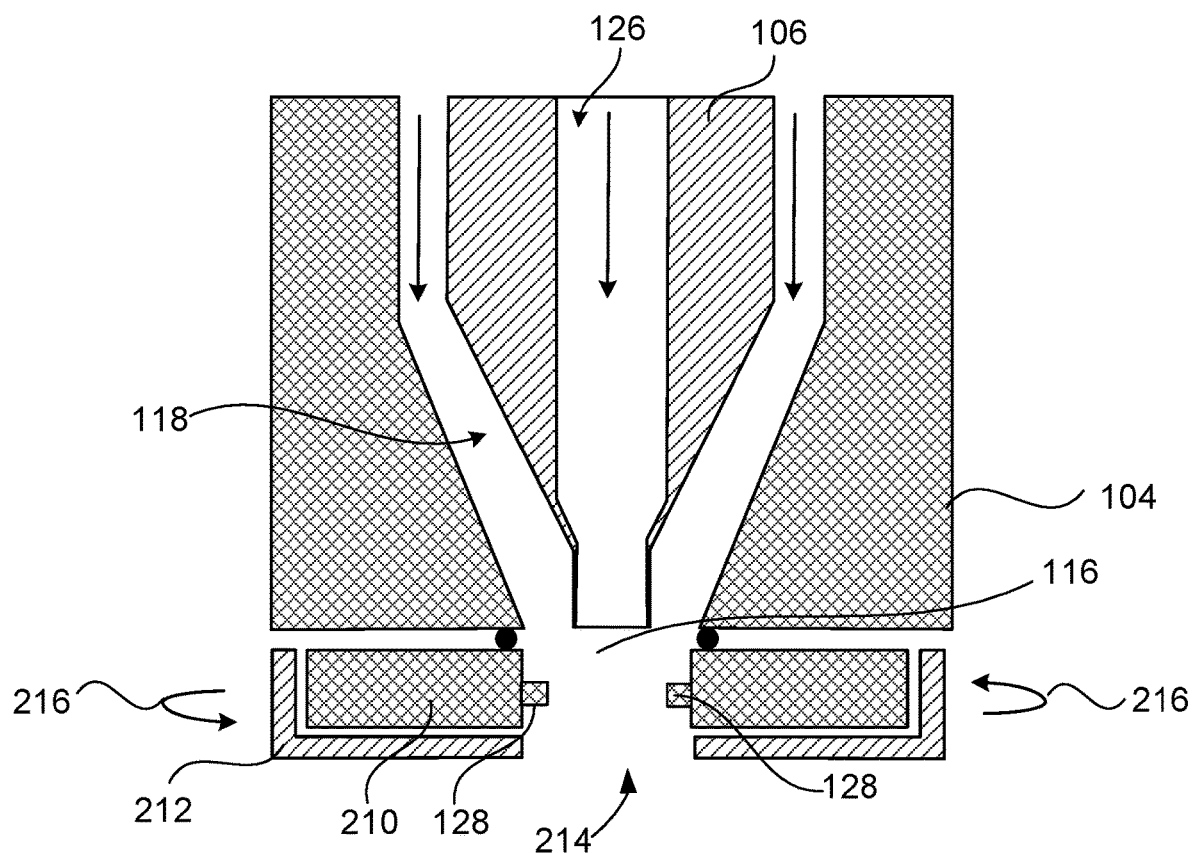
FIG. 7 is a cross-section of an outlet portion of the spinneret of the machine shown in FIG. 6.
Figure 8:
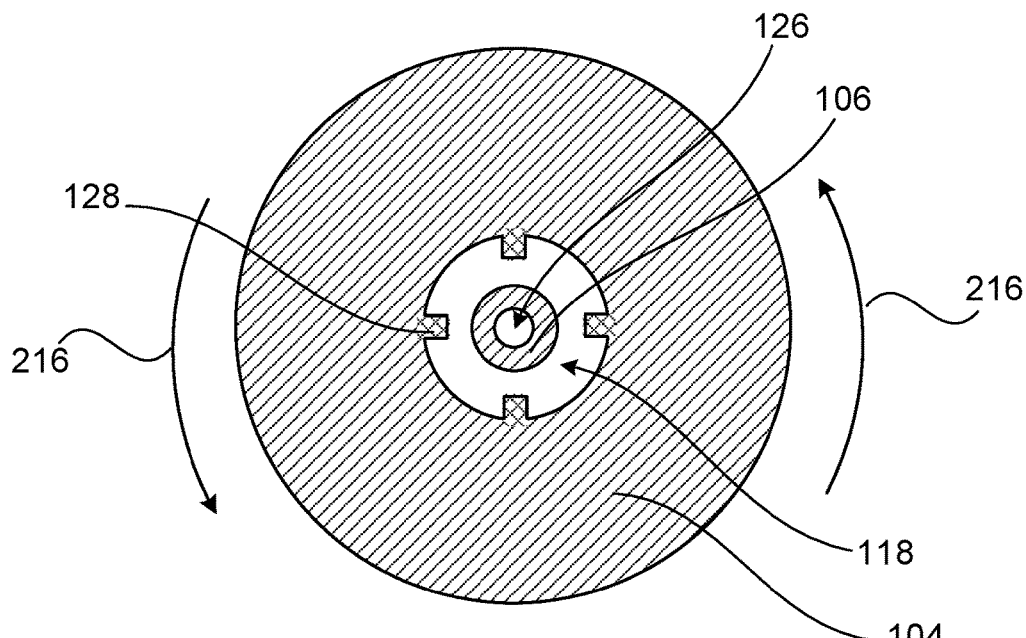
FIG. 8 is a planar view of the outlet portion of the spinneret of the machine shown in FIG. 6.

FIG. 6 illustrates a machine 200 for use in producing fibers using a spinneret 202. The machine 200 is substantially similar to the machine 100 but rotates an insert 210 mounted below a spinneret 202 rather than rotating the base 104 of the spinneret 202. The machine 200 also includes an insert holder 212 receiving the insert 210. The connecting gear 108 of the machine 200 is coupled to the motor 110 and the insert holder 212 rather than being coupled to the motor 110 and the base 104 like the connecting gear 108 of the machine 100. The insert holder 212 is coupled to the base 104 so that the insert holder 212 is free to rotate relative to the base 104. The insert holder 212 and the insert 210 are coupled so that rotating the insert holder 212 also rotates the insert 210. Using the control unit 111 to operate the motor 110 rotates the insert 210 via the connecting gear 108 and insert holder 212.

The spinneret 202 is substantially similar to the spinneret 102 and includes the base 104 and the needle 106 described with reference to FIGS. 1-3. However, the spinneret 202 is a conventional spinneret that does not include the projections 128 that are part of the spinneret 102.

The base 104 and the needle 106 of the spinneret 202 define the first channel 118 and the second channel 126 described with reference to FIGS. 1-3. The first channel 118 and the second channel 126 merge at the outlet 116 of the spinneret 202. The insert 210 defines a central channel 214 that extends through the insert 210. The insert 210 is detachably mounted to the base 104 so that the central channel 214 aligns with the outlet 116 such that the central channel 214 of the insert 210 and the outlet 116 of the spinneret 202 are in fluid communication.

Inserts have at least one projection that extends into the central channel of the insert. The insert 210 has four projections 128 that extend into the central channel 214. Some inserts have other numbers of projections (for example, one projection, two projections, three projections, five projections, or six projections). Arrows 216 show the insert 210 and insert holder 212 rotating in a first direction. In operation, the motor 110 may also rotate in a second direction, opposite the first direction.

The machine 200 can be used to perform the method 400 described with reference to FIG. 4. The machine 200 and the machine 100 (see FIG. 1) operate similarly to produce a solid fiber or hollow fiber (i.e. by flowing a first and second fluid through channels within the spinneret 102, 202). However, operation of the motor 110 rotates the insert 210 and the associated projections 128 rather than rotating the base 104.

Some systems and methods use stationary blades extending into resin channels to produce corrugations in the fibers being produced. Rather than rotating the blades, these systems use blades set at an angle relative to the axis of the channel into which the blades extend to induce rotation in the polymer being extruded while forming corrugations in the polymer. The blades can extend into a channel for carrying resin or other fluids from the base of the spinneret, from the needle of the spinneret, or from both the base and the needle of the spinneret.

Figure 9:
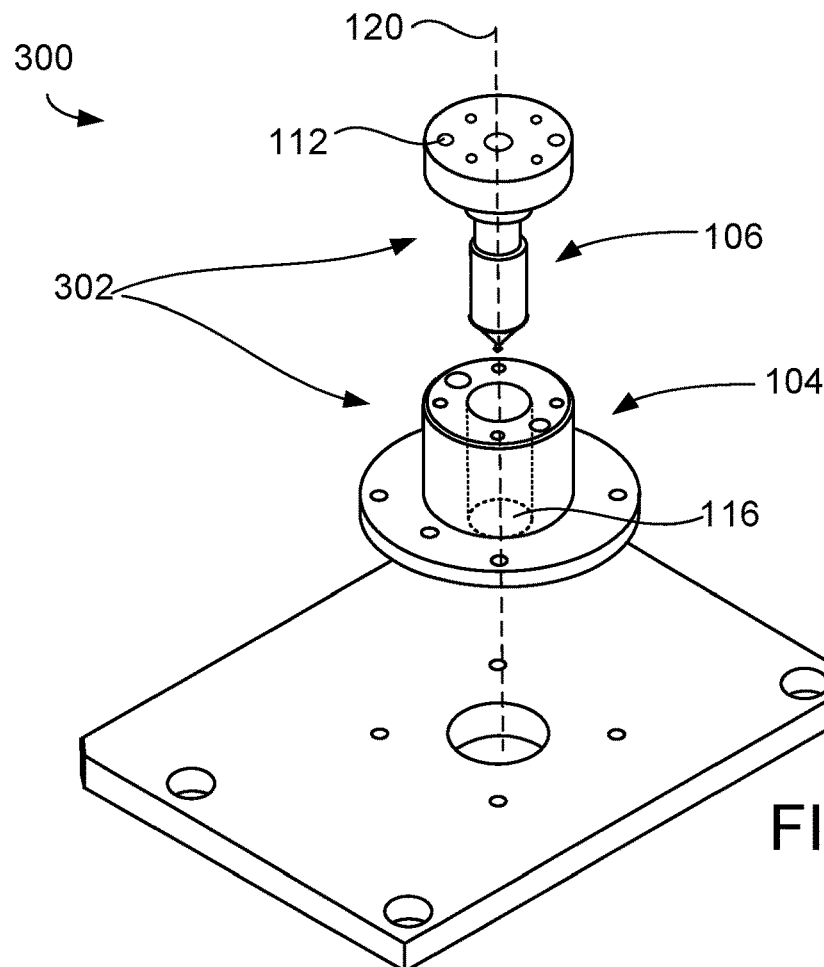
FIG. 9 shows a machine for use in producing fibers using a spinneret.

FIG. 9 illustrates a machine 300 for producing spacer fibers that includes a spinneret 302. The spinneret 302 includes a base 104 and a needle 106.

FIGS. 10A-10C and FIG. 11 show a portion of the spinneret 302 near the outlet 116 of the spinneret 302. The spinneret 302 is substantially similar to the spinneret 102 described with reference to FIGS. 1-3. However, rather than rotating projections, the spinneret 302 includes blades 304 extending into the first channel 118 to form corrugations in the surface of the fibers formed by the machine 300. The blades 304 include a surface 306 set at an acute angle relative to the axis 120 of the channel 118 into which the blades 304 extend.

The base 104 and the needle 106 at least partially define the channel 118. The base 104 provides an outer wall of the channel 118 and the needle 106 provides an inner wall of the channel 118. The channel 118 is in fluid communication with the outer inlet 112 and the outlet 116. The needle 106 also contains a channel 126 inside the needle 106. The channel 126 is in fluid communication with the central inlet and the outlet 116 of the spinneret 302. The needle 106 separates the channel 118 from the channel 126. The channel 118 is annular and the channel 126 is concentric with the channel 118. In operation, the machine 300 flows a first fluid (for example, a polymer) through the channel 118 and flows a second fluid (for example, a bore fluid) through the channel 126 within the needle 106.

Figure 10A:
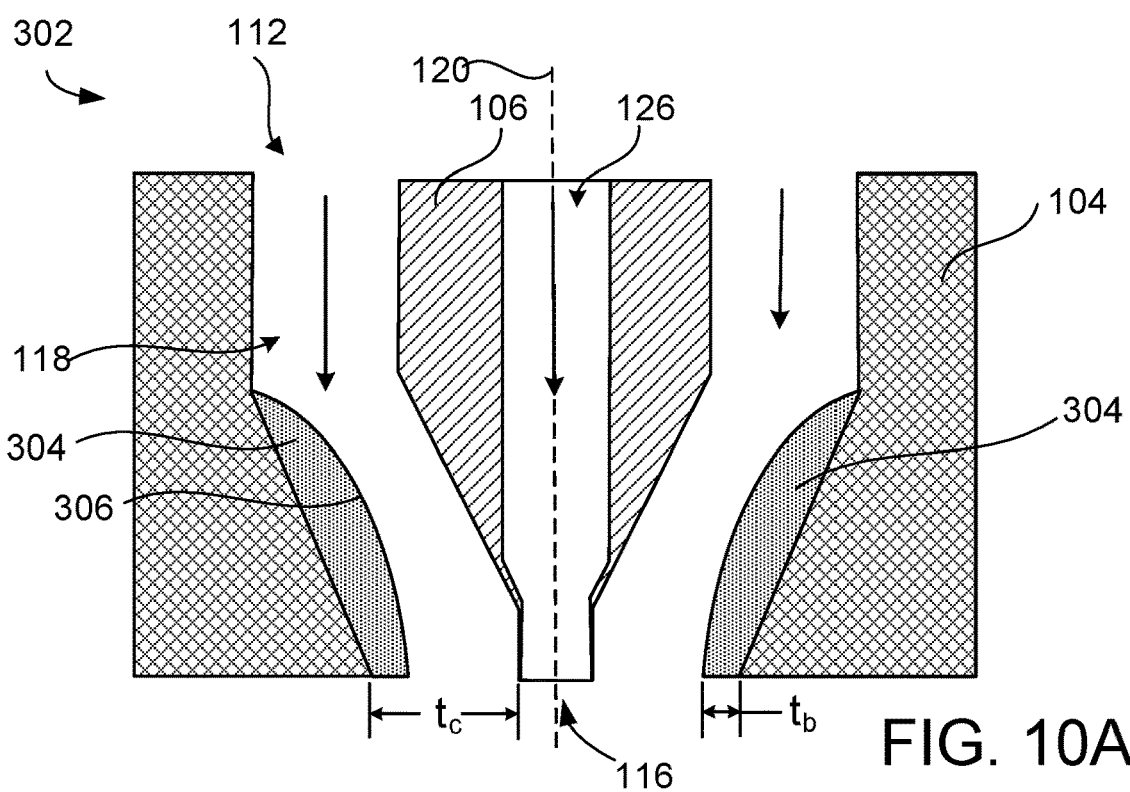
FIG. 10A is a schematic view of an outlet portion of a spinneret that can be used in the machine shown in FIG. 9.
Figure 10B:
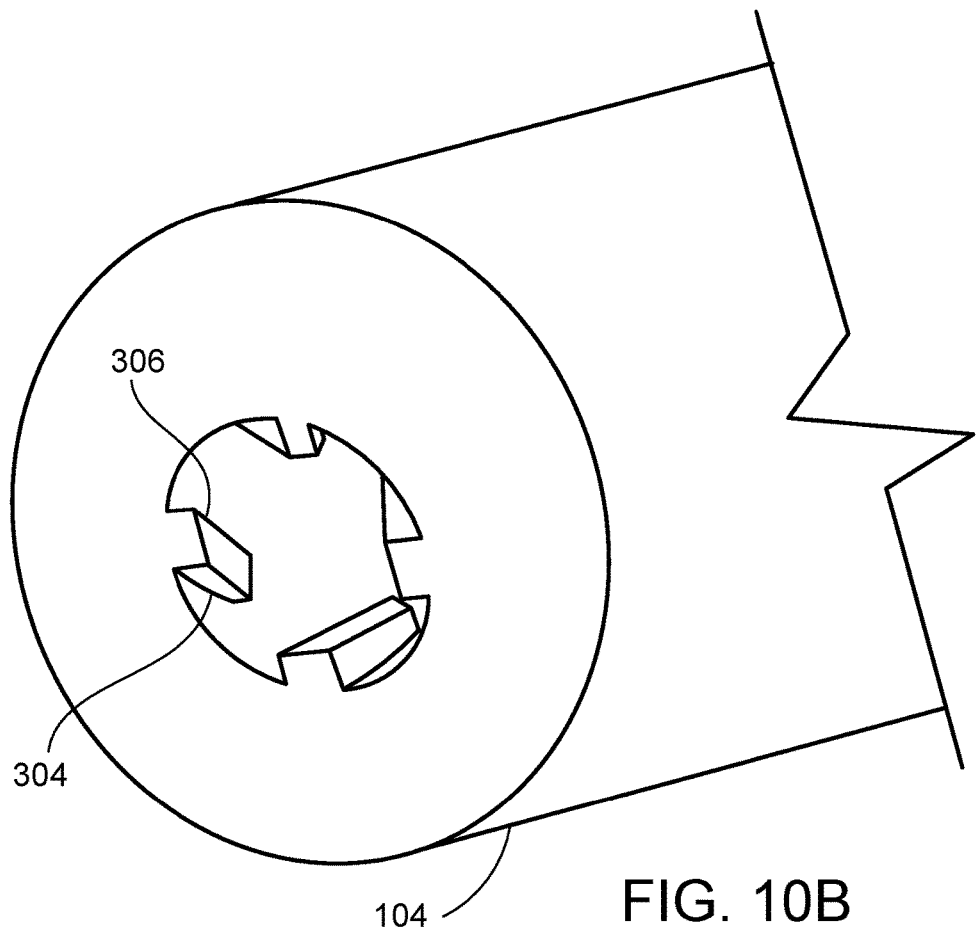
FIG. 10B is a perspective view of the outlet portion of the spinneret base of the spinneret shown in FIG. 10A.
Figure 10C:
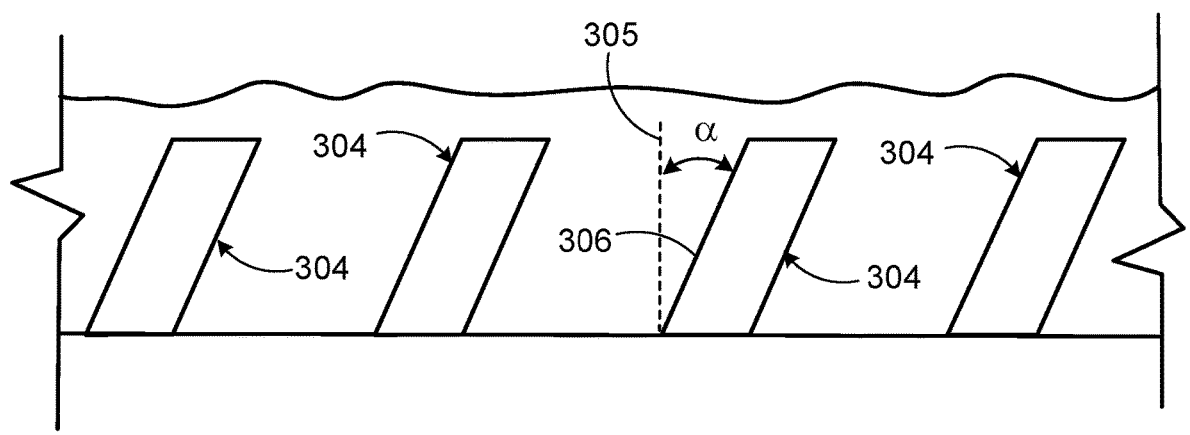
FIG. 10C is schematic side view of a portion of the inner surface of the outlet portion of the spinneret base shown in FIG. 10B. For the purpose of illustrating the orientation of the blades.
Figure 11:
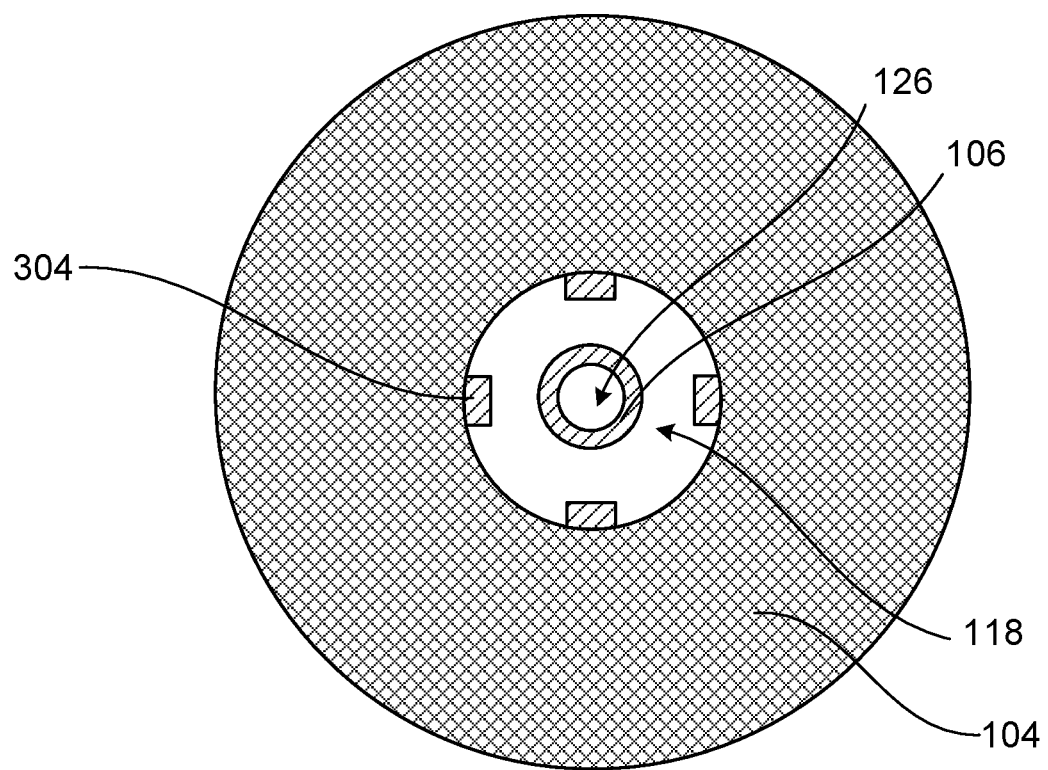
FIG. 11 is a cross-sectional view of the outlet portion of the spinneret shown in FIG. 10 taken at the end of the spinneret.

The spinneret 302 includes four blades 304, at the distal end of the spinneret 302. The blades 304 are disposed on the base 104 of the spinneret 302 extending into a channel 118. Each of the blades 304 haves a surface set at an acute angle $\alpha$ (see FIG. 11) between 30 to 85 degrees relative to the axis 120 of the channel 118 into which the blades 304 extend. FIG. 10C shows the angle $\alpha$ relative to a projection 305 of the axis 120 of the channel 118 against the wall from which the blades 304 extend.

The angle is chosen based on the viscosity of the fluid that the system is configured to extrude. Lower angles (slightly tilted compare to needle direction) are appropriate for highly viscous solutions (for example, more than 7,000 centipoise) while higher angles are appropriate for less viscous solutions (for example, less than 7,000 centipoise). In the spinneret 302, the angle $\alpha$ is approximately 30 degrees. The blades 304 on spinneret 302 are evenly spaced around a circumference of the channel 118. The blades 304 terminate at the outlet 116 of the spinneret 302.

The channel 118 has a thickness $t_c$ and the blades 304 have a thickness $t_b$. The thickness $t_b$ of the blades 304 is generally between 10 to 50% of the thickness $t_c$ of the channel 118. In the illustrated spinneret 302, the thickness $t_b$ of the blades 304 is approximately 30% of the thickness $t_c$ of the channel 118.

Some spinnerets have different blade configurations. Some spinnerets have other numbers of blades (for example, one blade, two blades, three blades, five blades, or six blades). The length, thickness, and angle of the blades may also vary. Changing features of the blade, such as, the length, thickness, or angle of the channel 118 alters the corrugation on the surface of the fiber. For example, a steeply angled blade produces a smaller pitch, resulting in a tighter coil. In some spinnerets, the angle $\alpha$ is between 5 and 60 degrees. Alternatively, thicker blades produce grooves that are deeper, wider, or deeper and wider grooves in a coiled corrugation than thinner blades. In some spinnerets, the blades terminate upstream of the spinneret outlet.

Figure 12:
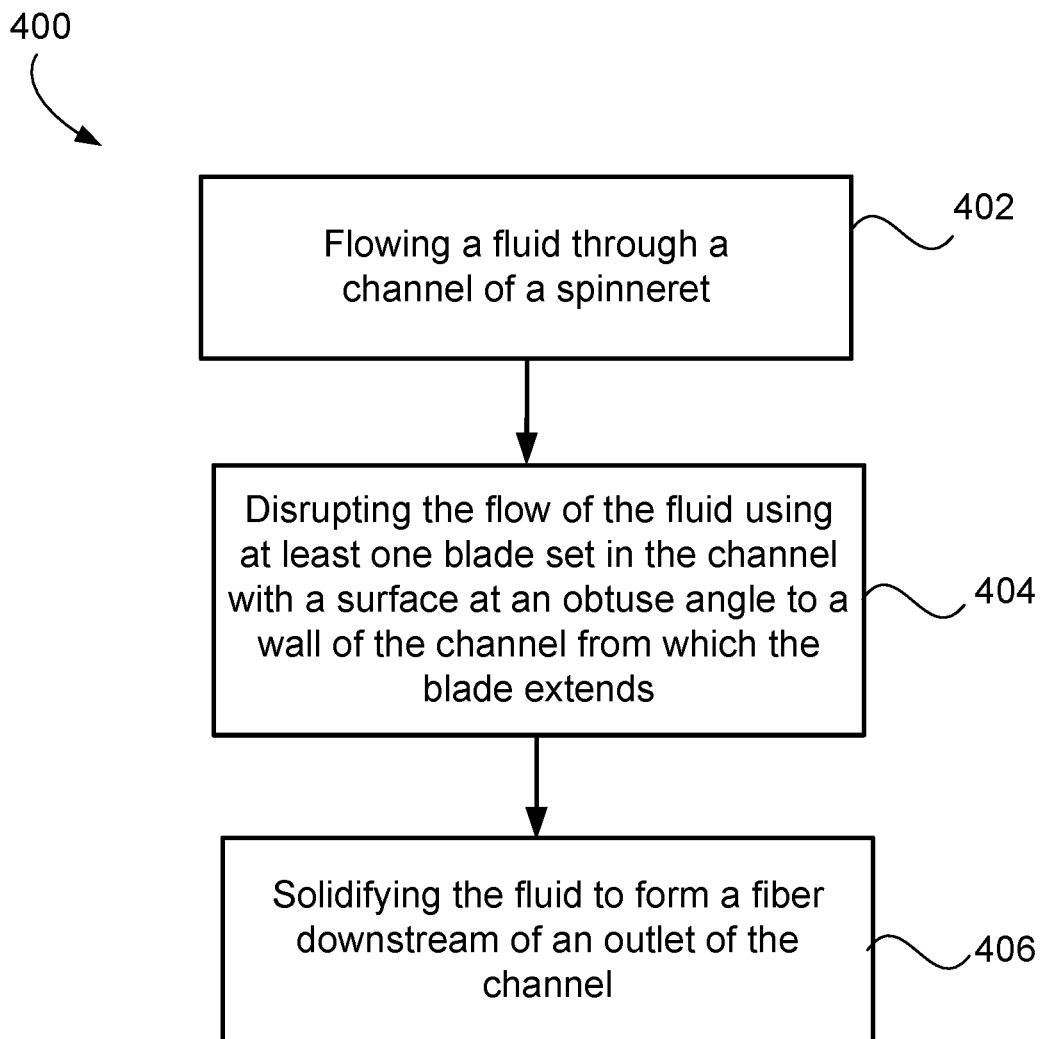
FIG. 12 shows a method for producing a fiber.

FIG. 12 illustrates a method 400 for producing fibers using the machine 300. The method 400 is described with reference to the machine 300 and its components shown in FIG. 9-11. The method 400 includes flowing a fluid through a channel of the spinneret (step 402), disrupting the flow of the fluid using at least one blade set in the channel with a surface at an acute angle to a wall of the channel from which the blade extends (step 404), and solidifying the fluid to form a fiber downstream of an outlet of the channel (step 406).

In operation, the machine 300 flows a first fluid (for example, a polymer) through the channel 118. The first fluid proceeds through the channel 118 in the direction of arrows. The blades 304 extend into the first channel 118 from the wall of the base 104. As the first fluid flows, the blades 304 interact with an outer surface of the first fluid and disrupt the fluid flow. The fluid rotates relative to the axis 120 of the channel 118 with the blades 304 forming a corrugation in an outer surface of the first fluid. The first fluid exits the outlet 116 and solidifies into a fiber with the corrugation(s) in its outer surface. Similarly to the machine 100, the machine 300 can be used to form both solid and hollow fibers.

Figure 13A:
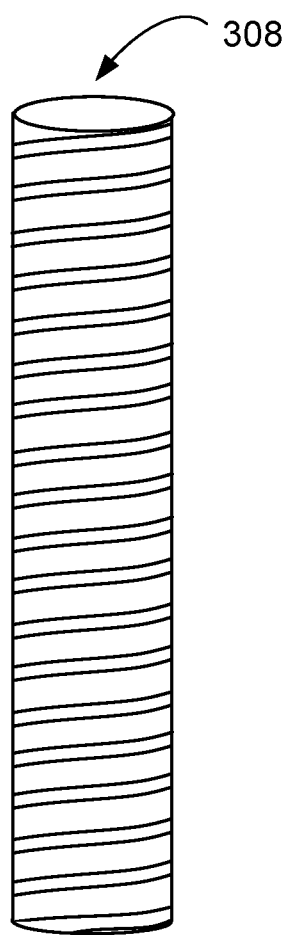
FIG. 13A shows an exemplary solid fiber produced by a spinneret with blades on a base of the spinneret.
Figure 13B:
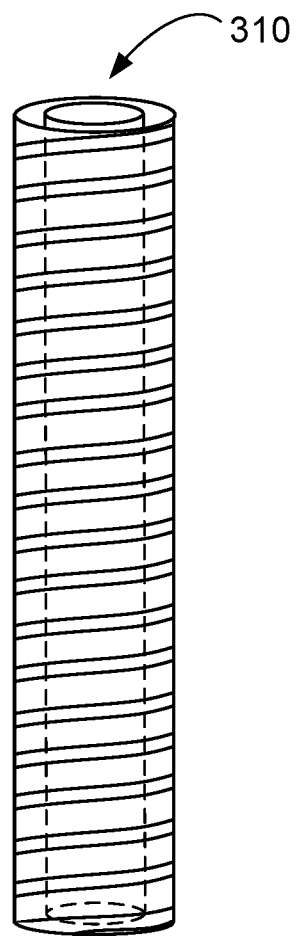
FIG. 13B shows an exemplary hollow fiber produced by the machine shown in FIG. 9 using the spinneret shown in FIG. 10.

FIGS. 13A and 13B illustrate fibers produced by the machine 300. The fiber 308 is a solid fiber with a corrugated outer surface. The fiber 310 is a hollow fiber with a corrugated outer surface and a smooth inner surface.

Figure 14:
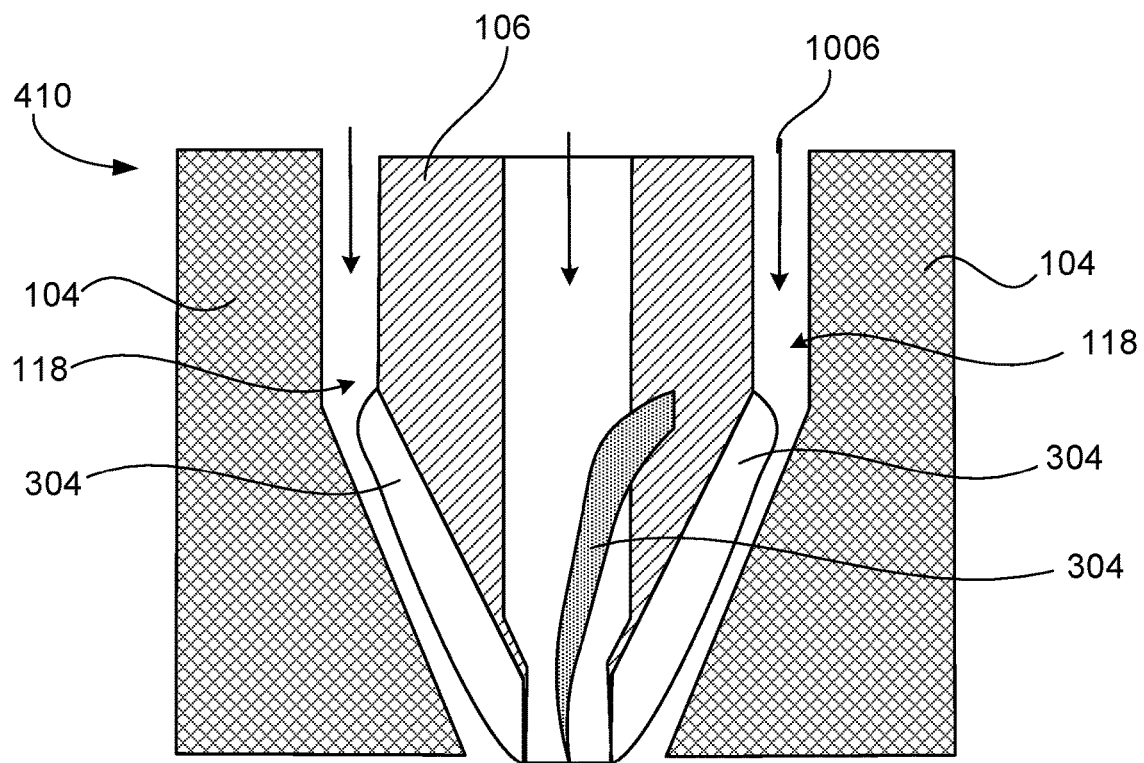
FIG. 14 is a schematic view of an outlet portion of a spinneret that can be used in the machine shown in FIG. 9.
Figure 15:
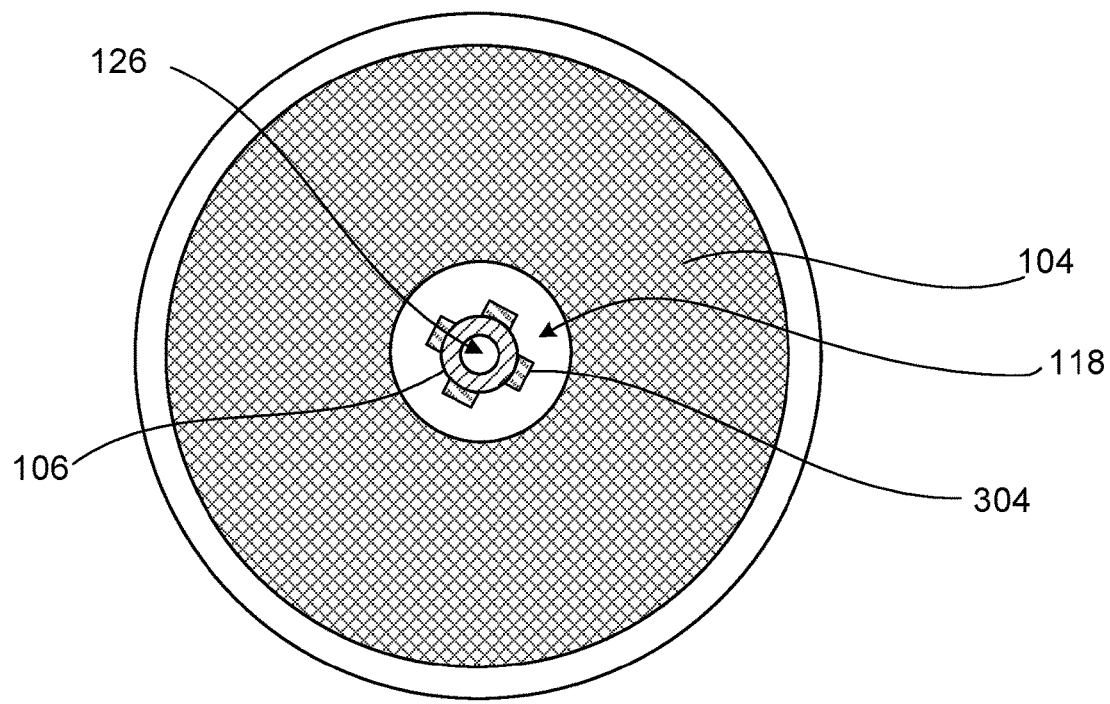
FIG. 15 is a planar schematic view of the outlet portion of the spinneret shown in FIG. 14.

FIGS. 14 and 15 illustrate another spinneret that can be used with the machine 300. The spinneret 410 is substantially the same as the spinneret 302 described with reference to FIGS. 9-11. However, the spinneret 410 has blades extending into the channel 118 from the needle 106 rather than from the base 104 of the spinneret 410. With the spinneret 410, the machine 300 creates hollow fibers with corrugated inner surfaces.

Figure 16A:
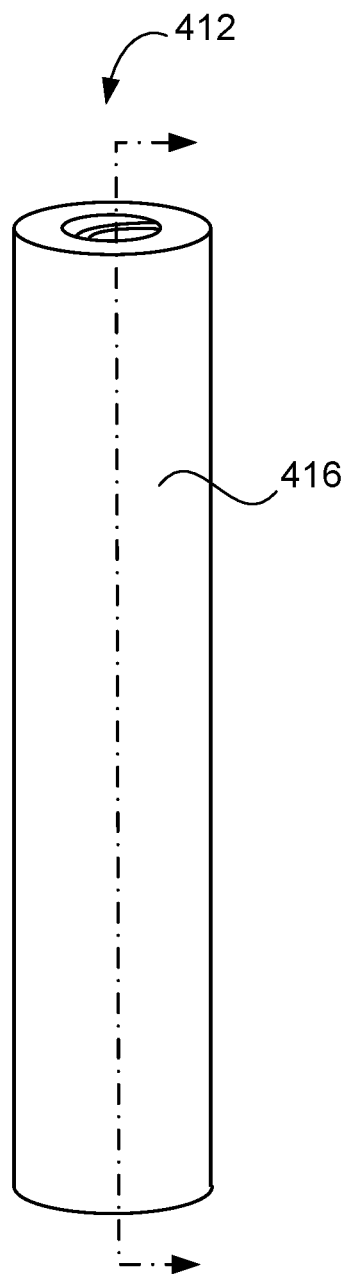
FIGS. 16A-B shows an exemplary hollow fiber produced by the machine shown in FIG. 9 using the spinneret shown in FIG. 14.
Figure 16B:
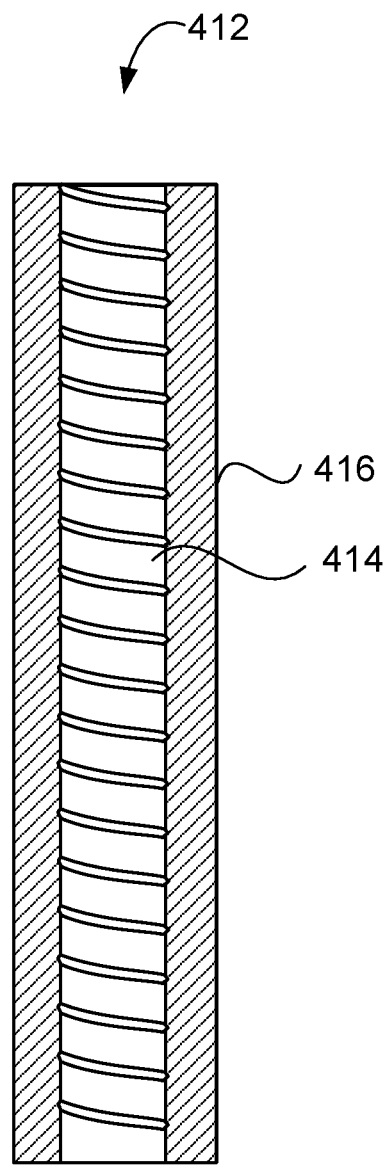

FIGS. 16A and 16B show a fiber 412 formed using spinneret 402 on the machine 300. The fiber 412 is hollow with a corrugated inner surface 414 and a smooth outer surface 416.

Figure 17:
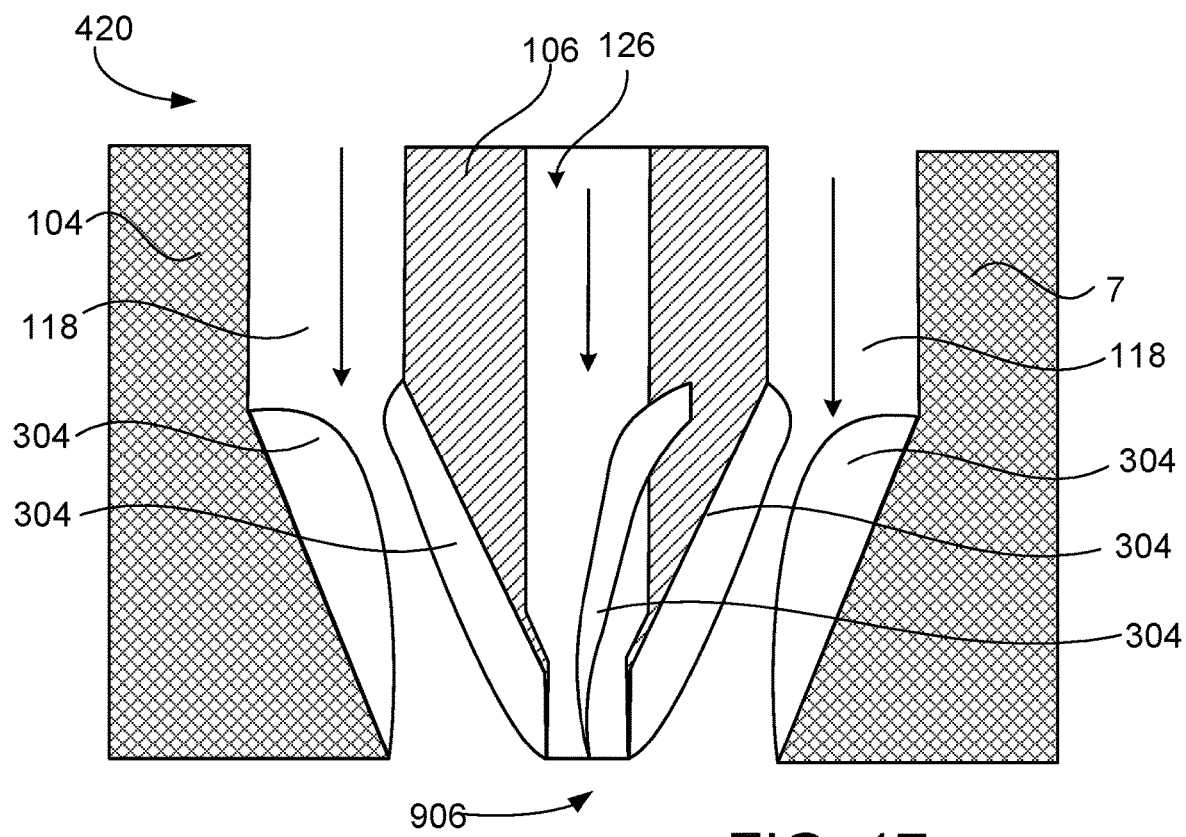
FIG. 17 is a schematic view of an outlet portion of a spinneret that can be used in the machine shown in FIG. 9.
Figure 18:
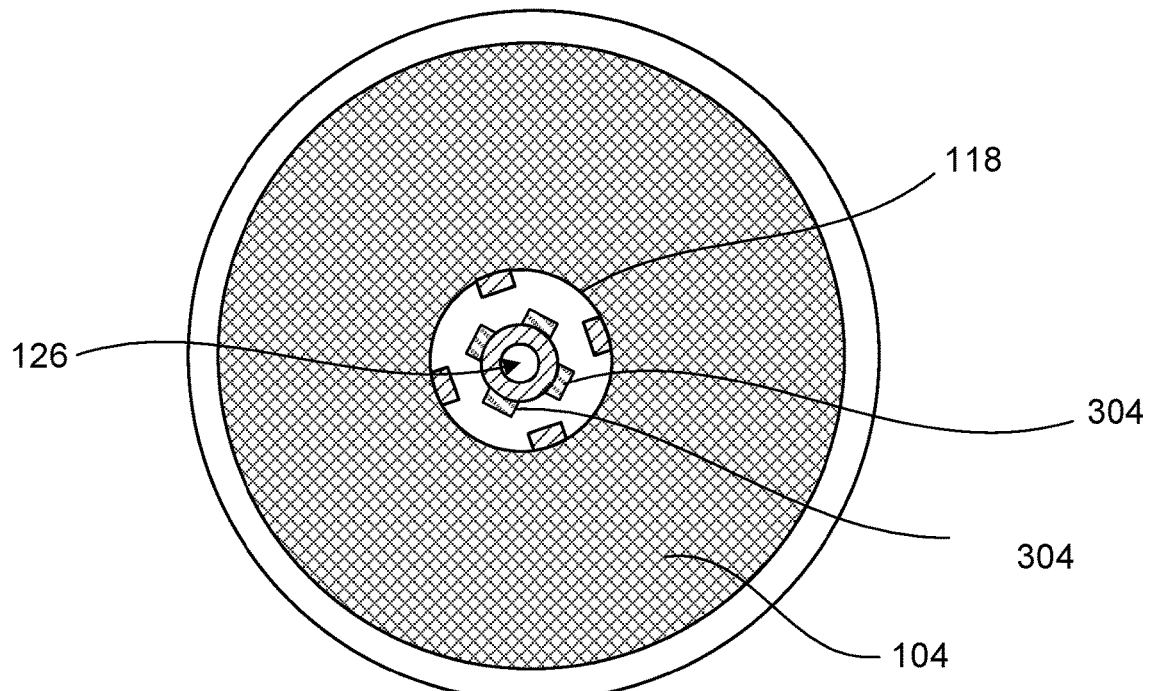
FIG. 18 shows a planar schematic view of the outlet portion of the spinneret shown in FIG. 17.

FIGS. 17 and 18 illustrate another spinneret that can be used with the machine 300. The spinneret 420 is substantially the same as the spinneret 302 described with reference to FIGS. 9-11. However, in the spinneret 420, a first set of the blades 304 extend into the channel 118 from the needle 106 and a second set of the blades 304 extend into the channel 118 from the base 104 of the channel 118. With the spinneret 420, the machine 300 creates hollow fibers with corrugated inner and outer surfaces.

Figure 19A:
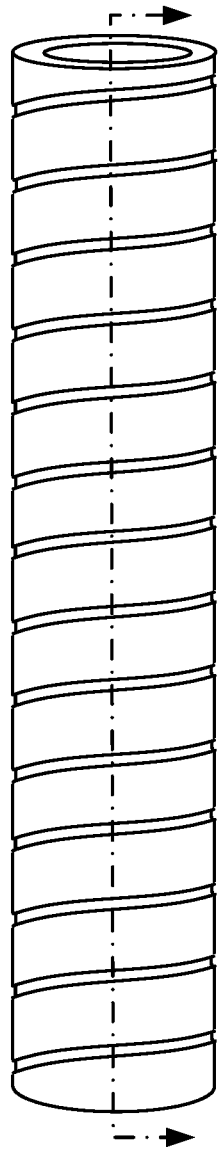
FIGS. 19A-B shows an exemplary hollow fiber produced by the machine shown in FIG. 9 using the spinneret shown in FIG. 17.
Figure 19B:
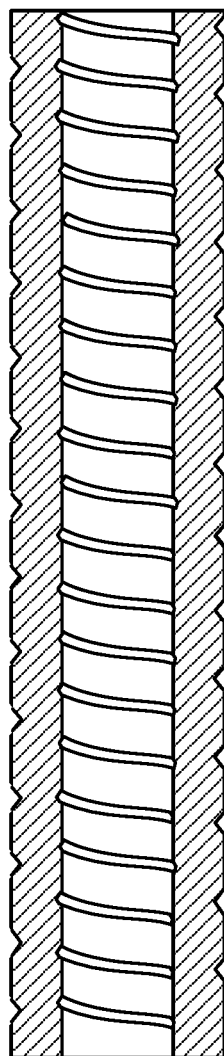

FIGS. 19A-B shows a hollow fiber formed using spinneret 402 on the machine 300. The fiber 422 is hollow with a corrugated inner surface and a corrugated outer surface.

A number of embodiments of the invention have been described. Nevertheless, it will be understood that various modifications may be made without departing from the spirit and scope of the invention. For example, although the spinneret 302 described with reference to FIGS. 9-11 includes four blades 304, some spinnerets have other numbers of blades (for example, 1 blade, 2 blades, 3 blades, 5 blades, or 6 blades). Accordingly, other embodiments are within the scope of the following claims.

What is claimed is:

1. A method for producing fibers with corrugations, the method comprising:
    flowing a first fluid through a first channel at least partially defined in a spinneret;
    rotating a projection of the spinneret that extends into the first channel of the spinneret as the first fluid flows past the projection; and
    solidifying the first fluid to form a fiber downstream of the projection;
    wherein rotating the projection comprises rotating the projection in a first direction and rotating the projection in a second direction opposite the first direction.

2. The method of claim 1, further comprising flowing a second fluid through a second channel concentric with the first channel.

3. The method of claim 1, wherein rotating the projection comprises rotating a base of the spinneret from which the projection extends.

4. The method of claim 1, wherein rotating the projection comprises rotating a plurality of projections.

5. The method of claim 1, further comprising placing an insert from which the projection extends into a cap downstream of a base of the spinneret.

6. The method of claim 5, wherein rotating the projection comprises rotating the insert.

7. The method of claim 1, wherein rotating the projection comprises repeatedly rotating the projection in the first direction and rotating the projection in the second direction opposite the first direction.

8. The method of claim 1, wherein rotating the projection comprises rotating the projection in the first direction for a first interval and rotating the projection in the second direction opposite the first direction for a second interval.

9. The method of claim 8, wherein the first interval and second interval are equal.

10. The method of claim 1, wherein rotating the projection comprises rotating the projection in the first direction and rotating the projection in the second direction opposite the first direction.

* * * * *